(12) United States Patent
Lee et al.

(10) Patent No.: US 9,054,503 B2
(45) Date of Patent: Jun. 9, 2015

(54) SUPPORT APPARATUS FOR INSULATOR ARM

(71) Applicant: Korea Electric Power Corporation, Seoul (KR)

(72) Inventors: Won-Kyo Lee, Daejeon (KR); Chan-Hyeong Park, Daejeon (KR); Ho-Kwon Lee, Daejeon (KR); Koo-Yong Shin, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 156 days.

(21) Appl. No.: 13/632,845

(22) Filed: Oct. 1, 2012

(65) Prior Publication Data

US 2013/0081872 A1 Apr. 4, 2013

(30) Foreign Application Priority Data

Sep. 29, 2011 (KR) .......................... 10-2011-0099282

(51) Int. Cl.
*H02G 7/00* (2006.01)

(52) U.S. Cl.
CPC ...................................... *H02G 7/00* (2013.01)

(58) Field of Classification Search
USPC .......... 174/45 R, 138 D, 40 R, 90, 84 R, 195, 174/158 R
See application file for complete search history.

(56) References Cited

U.S. PATENT DOCUMENTS 3,649,740 A * 3/1972 Boyer et al. ..................... 174/43
3,681,512 A * 8/1972 Werner et al. ............... 174/84 R

FOREIGN PATENT DOCUMENTS

JP 11-127531 A 5/1999
KR 2010-0913253 8/2009

* cited by examiner

*Primary Examiner* — Dhirubhai R Patel
(74) *Attorney, Agent, or Firm* — McDermott Will & Emery LLP

(57) ABSTRACT

A support apparatus for an insulator arm is disclosed. The support apparatus for an insulator arm in accordance with an embodiment of the present invention includes: a first key cap connector and a second key cap connector coupled, respectively, with a first insulator arm and a second insulator arm that are divided, respectively, from a pair of insulator arms; a Y-shaped saddle coupled with the first key cap connector and the second key cap connector; and an insulator arm support metal fitting coupled with the Y-shaped saddle and connecting the pair of insulator arms with each other.

8 Claims, 5 Drawing Sheets

SUPPORT APPARATUS FOR INSULATOR ARM

CROSS-REFERENCE TO RELATED APPLICATIONS

This application claims the benefit of Korean Patent Application No. 10-2011-0099282, filed with the Korean Intellectual Property Office on Sep. 29, 2011, the disclosure of which is incorporated herein by reference in its entirety.

BACKGROUND

1. Technical Field

The present invention relates to a support apparatus for an insulator arm for a compact pylon.

2. Background Art

Polymer insulator arms are known to have been used to make pylons simpler, lighter and smaller. There also have been efforts to minimize the longitudinal distance between electric cables and holding the electric cables stably on the transmission pylons, which are metal structures used for supporting the transmission lines, while making the pylons smaller.

FIG. 1 shows a conventional insulator arm.

Referring to FIG. 1, the conventional insulator arm is constituted with a pair of primary insulator arms 10 and a pair of supplementary insulator arms 11. The primary insulator arms are installed on a main body of a pylon to support transmission line, and their supporting forces are reinforced by the supplementary insulator arms 11, which correspond, respectively, to the primary insulator arms 10 and are connected to the main body of the pylon.

For application in compact pylons, the conventional insulator arm is made of fiberglass reinforced plastics (FRP). The FRP is lighter than porcelain materials or glass materials and thus can be readily transported and installed. Moreover, the FRP has better leakage current characteristics and is more price-competitive than the porcelain materials. The insulator arm using the FRP can make the pylon lighter and smaller, thereby making it possible to reduce the land required for constructing the transmission pylons.

However, the FRP has an anisotropic structure, hence better tensile strength than the porcelain insulator, but the compressive strength is only between $1/5$ and $1/10$ of that of the porcelain insulator. Accordingly, in the case that a torsional stress, which can occur in a transmission line, is applied to the insulator arm made of the FRP by the wind, adhesive force is lost in resin that organically binds glass fibers within the FRP, causing internal cracks and possibly resulting in deterioration due to permeation of moisture. Besides, if the temperature and humidity are increased, the mechanical strength of the insulator arm can be critically sacrificed.

SUMMARY

The present invention provides a support apparatus for an insulator arm that can support the insulator arm to prevent damage in the insulator arm that may be caused by mechanical stress.

An aspect of the present invention features a support apparatus for an insulator arm that can support the insulator arm for a compact pylon.

The support apparatus for an insulator arm in accordance with an embodiment of the present invention can include: a first key cap connector and a second key cap connector coupled, respectively, with a first insulator arm and a second insulator arm that are divided, respectively, from a pair of insulator arms; a Y-shaped saddle coupled with the first key cap connector and the second key cap connector; and an insulator arm support metal fitting coupled with the Y-shaped saddle and connecting the pair of insulator arms with each other.

The first key cap connector and the second key cap connector can include: an insulator arm insertion hole having the first insulator arm or the second insulator arm inserted thereinto; and a coupling portion having a bolt insertion hole formed therein such that the first key cap connector and the second key cap connector are coupled with each other.

The coupling portion can be formed in such a way that the coupling portion of the first key cap connector and the coupling portion of the second key cap connector are overlapped and coupled with each other.

The coupling portion of the first key cap connector and the coupling portion of the second key cap connector can be formed to be coupled with each other in a socket-type structure.

The Y-shaped saddle can have a bolt insertion hole formed therein for coupling with the coupling portion and the insulator arm support metal fitting.

The insulator arm support metal fitting can include: a support rod connected with the Y-shaped saddle; and a support-rod-connecting insulator connected with the support rod.

The support rod can be formed in a Y-shape and can include a bolt insertion hole for connection with the Y-shaped saddle and an insulator insertion hole having the support-rod-connecting insulator inserted thereinto.

If the insulator arm is divided into three or more pieces, two or more support apparatuses can be installed.

If two or more of the support apparatuses are installed, the plurality of insulator arm support metal fittings can be connected to cross one another.

DETAILED DESCRIPTION

Figure 1:
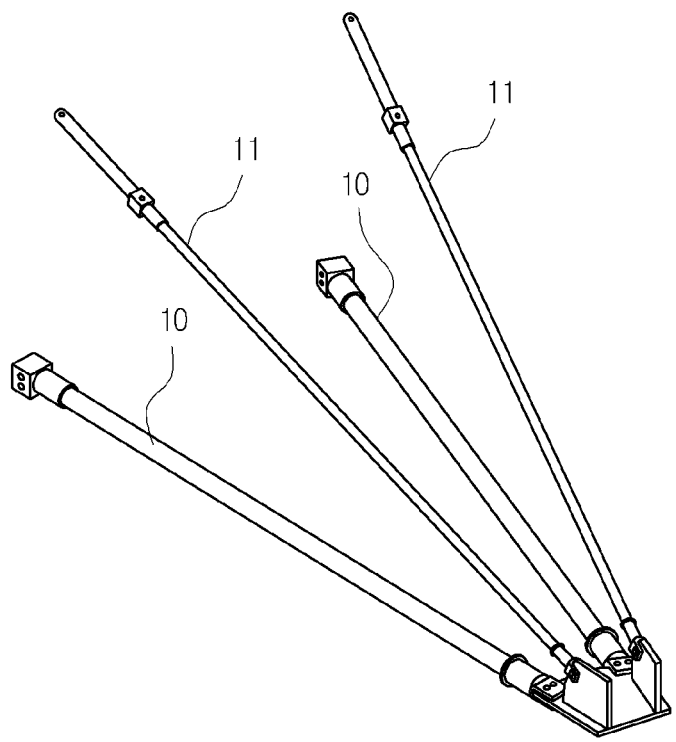
FIG. 1 shows a conventional insulator arm.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain technology is determined to evade the point of the present invention, the pertinent detailed description will be omitted. Numerals (e.g., first, second, etc.) used in the description of the present invention are only for distinguishing one element from another element.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, some embodiments will be described in detail with reference to the accompanying drawings. Identical or corresponding elements will be given the same reference numerals, regardless of the figure number, and any redundant description of the identical or corresponding elements will not be repeated. Throughout the description of the present invention, when describing a certain technology is determined to evade the point of the present invention, the pertinent detailed description will be omitted.

Figure 2:
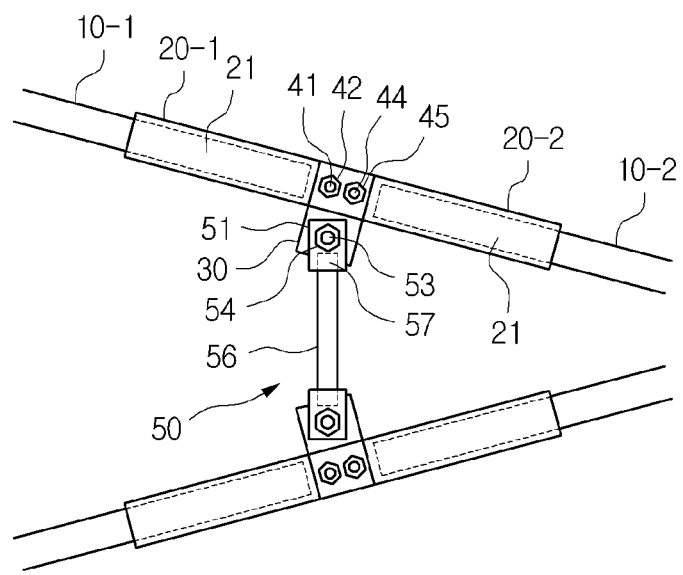
FIG. 2 shows a support apparatus that is installed in an insulator arm in accordance with an embodiment of the present invention.

FIG. 2 shows a support apparatus that is installed in an insulator arm in accordance with an embodiment of the present invention, and FIGS. 3 to 7 show components of the support apparatus for an insulator arm in accordance with an embodiment of the present invention.

Referring to FIG. 2, the support apparatus for an insulator arm includes a pair of key cap connectors 20-1, 20-2, which are installed, respectively, on each insulator arm, a Y-shaped saddle 30 and an insulator arm support metal fitting 50. Specifically, the insulator arm 10 is divided into two arms, which are a first insulator arm 10-1 and a second insulator arm 10-2, and a first key cap connector 20-1 and a second key cap connector 20-2 are coupled, respectively, to the first insulator arm 10-1 and the second insulator arm 10-2, and the two key cap connectors 20-1, 20-2 are connected to each other.

Figure 3:
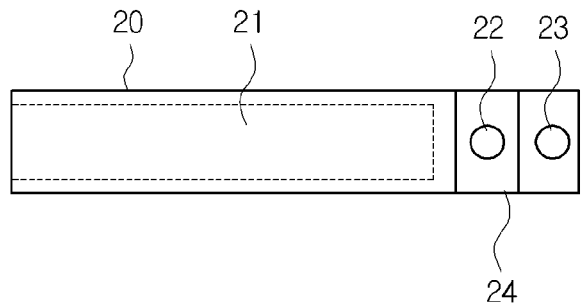
FIGS. 3 to 7 show components of the support apparatus for an insulator arm in accordance with an embodiment of the present invention.
Figure 4:
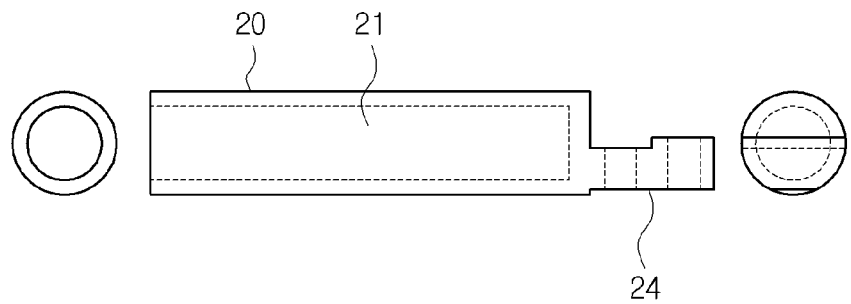
Figure 4:
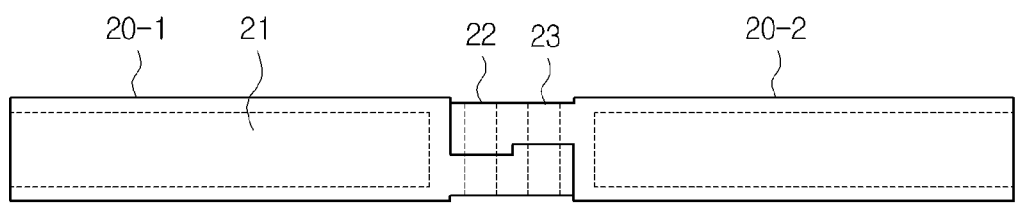

Referring to FIGS. 3 and 4, FIG. 3 shows a top view of a key cap connector 20, and FIG. 4 shows a side view of the key cap connector 20 and a side view of a pair of the key cap connectors 20 connected with each other. As shown in FIGS. 3 and 4, the key cap connector 20 is formed in a cylindrical shape, and one side thereof is formed with a coupling portion 24, by which the pair of key cap connectors 20 are connected with each other, and the other end thereof is formed with an insulator arm insertion hole 21, into which the first insulator arm 10-1 or the second insulator arm 10-2 is inserted. Here, the coupling portion 24 includes bolt insertion holes 22, 23 for fastening by use of a bolt and a nut. The coupling portions 24 for the pair of respective key cap connectors 20 can be formed in such a way that the coupling portions 24 are overlapped and coupled with each other.

Figure 5:
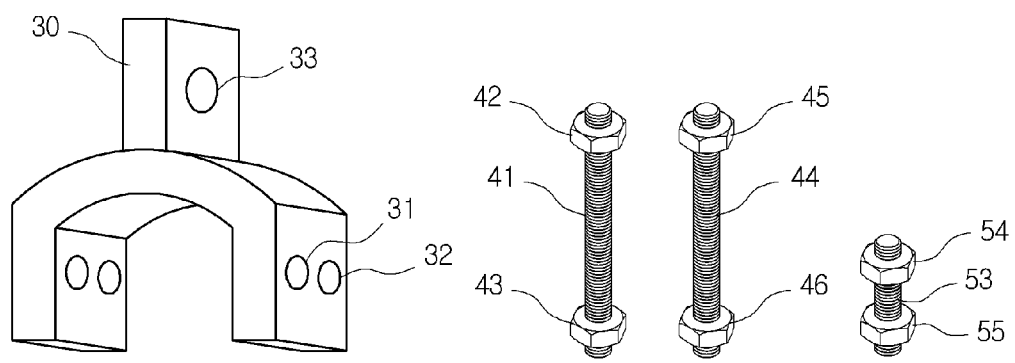

FIG. 5 shows the Y-shaped saddle, bots and nuts. Referring to FIG. 5, the Y-shaped saddle 30 is coupled with the coupling portions 24 of the connected pair of key cap connectors 20 and is fastened using bolts 41, 44 and nuts 42, 43, 45, 46 through bolt insertion holes 31, 32.

Figure 6:
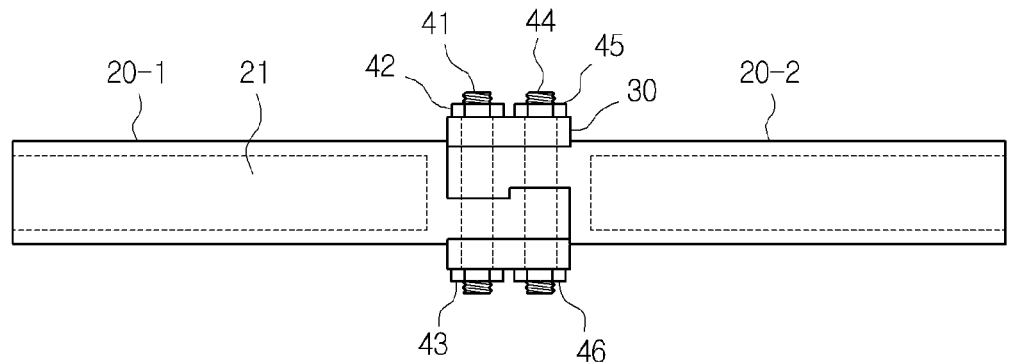
Figure 6:
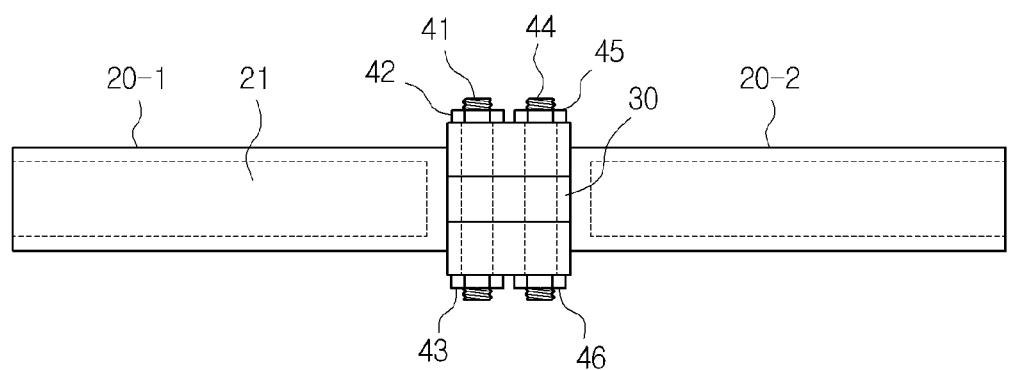

The pair of key cap connectors 20-1, 20-2 that are coupled and connected are illustrated in FIG. 6. FIG. 6 shows side views of the pair of key cap connectors 20 and the Y-shaped saddle 30 that are coupled through the bolts 41, 44 and the nuts 42, 43, 45, 46.

Figure 7:
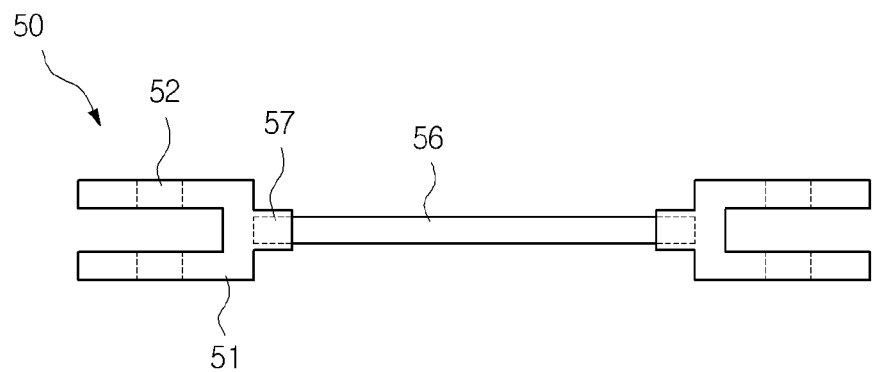

FIG. 7 shows the insulator arm support metal fitting 50. The insulator arm support metal fitting 50 includes a pair of support rods 51 and a support-rod-connecting insulator 56. Here, the support-rod-connecting insulator 56 can be made of FRP, like the insulator arm.

The support rod 51 is formed in a Y-shape, like the Y-shaped saddle 30, and includes a bolt insertion hole 52 for fastening with the Y-shaped saddle 30 by use of a bolt 53 and nuts 54, 55. Moreover, the support rod 51 includes an insulator insertion hole 57, into which the support-rod-connecting insulator 56 is inserted. Specifically, the bolt 53 is inserted into the bolt insertion hole 52 of the support rod 51 and a bolt insertion hole 33 of the Y-shaped saddle 30 to couple and fasten the support rod 51 with the Y-shaped saddle 30. Moreover, either end of the support-rod-connecting insulator 56 is inserted into the pair of support rods 51.

By coupling and fastening the components of the support apparatus for an insulator arm as described above, the support apparatus for an insulator arm can be installed in the pair of insulator arms 10, as illustrated in FIG. 2.

Figure 8:
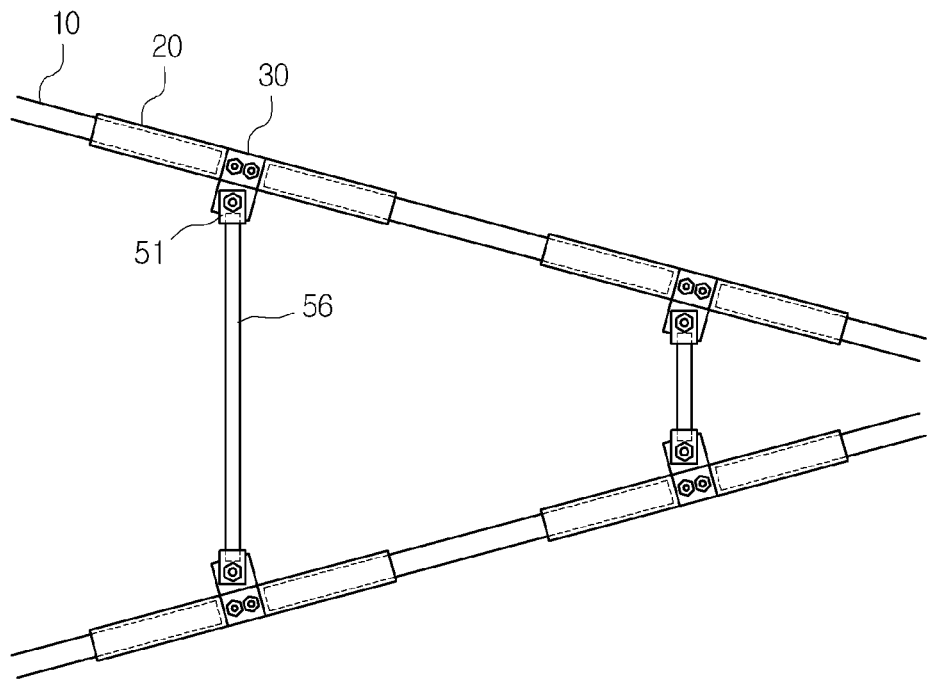
FIGS. 8 and 9 illustrate how the support apparatus for an insulator arm in accordance with an embodiment of the present invention is installed in the insulator arm.
Figure 9:
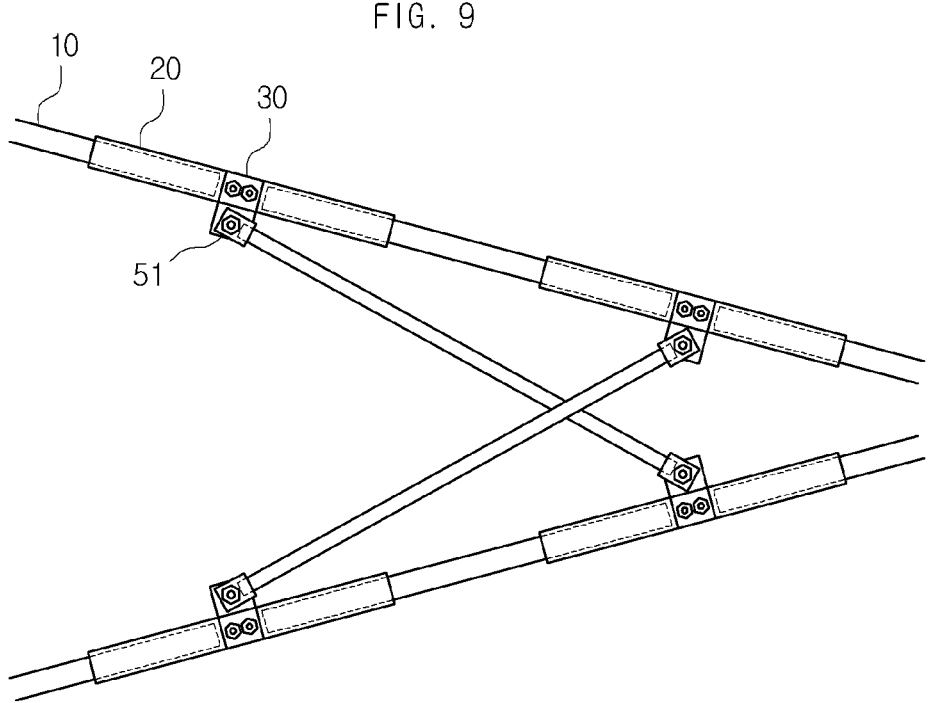

FIGS. 8 and 9 illustrate how the support apparatus for an insulator arm in accordance with an embodiment of the present invention is installed in the insulator arm. Specifically, FIG. 8 illustrates the support apparatus for an insulator arm that is installed when each insulator arm 10 is divided into three pieces.

The insulator arm 10 can be divided into two or more pieces, and the number of the support apparatuses for an insulator arm can be determined based on the number of the insulator arms 10.

Moreover, it is possible that the insulator arm support metal fittings 50 are cross-coupled when two or more support apparatuses for an insulator arm are installed. For example, as illustrated in FIG. 9, the insulator arm support metal fittings 50 can be installed in such a way that the insulator arm support metal fittings 50 cross each other.

Figure 10:
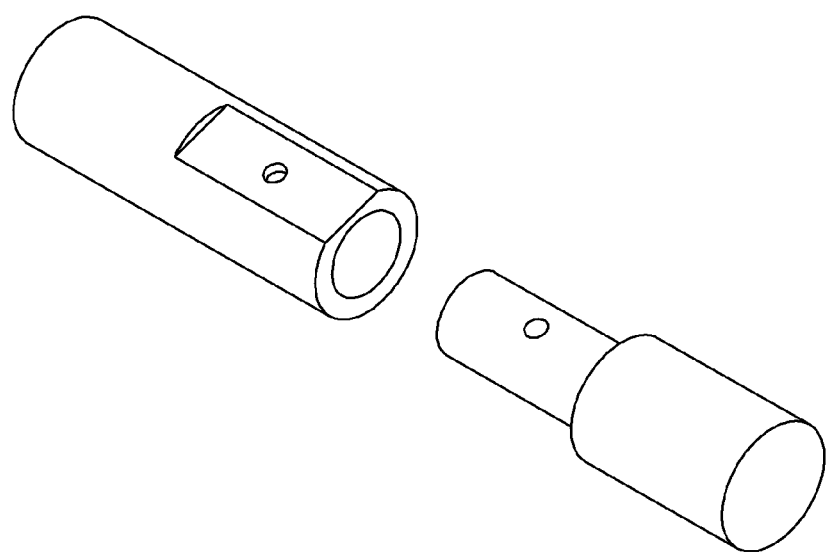
FIG. 10 illustrates a key cap connector in accordance with another embodiment of the present invention.

FIG. 10 illustrates the key cap connector in accordance with another embodiment of the present invention. Specifically, FIG. 10 shows the coupling portion 24 of the key cap connector 20 in accordance with another embodiment of the present invention.

As illustrated in FIG. 10, the coupling portions 24 for a pair of key cap connectors 20 can be formed in such a way that the coupling portions 24 are coupled with each other in a socket-type structure. Specifically, the coupling portion 24 of one of the key cap connectors 20 can have an insertion hole formed therein in such a way that the coupling portion 24 of the other of the key cap connectors 20 can be inserted into the insertion hole, and the coupling portion 24 of the other of the key cap connectors 20 can be formed in a plug shape in such a way that the coupling portion 24 of the other of the key cap connectors 20 can be inserted into the insertion hole.

While the present invention has been described with reference to certain embodiments, the embodiments are for illustrative purposes only and shall not limit the invention. It is to be appreciated that those skilled in the art can change or modify the embodiments without departing from the scope and spirit of the invention.

What is claimed is:

1. A support apparatus for an insulator arm for a compact pylon, comprising:
   a first key cap connector and a second key cap connector coupled, respectively, with a first insulator arm and a second insulator arm that are divided, the first key cap connector and the second key cap connector each having a coupling portion;
   a Y-shaped saddle coupled with the first key cap connector and the second key cap connector through the coupling portions; and
   an insulator arm support metal fitting comprising a support rod connected with the Y-shaped saddle and a support-rod-connecting insulator connected with the support rod, coupled with the Y-shaped saddle.

2. The support apparatus for an insulator arm of claim 1, wherein the first key cap connector and the second key cap connector comprise an insulator arm insertion hole having the first insulator arm or the second insulator arm inserted thereinto, and the coupling portions each have a bolt insertion hole formed therein.

3. The support apparatus for an insulator arm of claim 2, wherein the coupling portion is formed in such a way that the coupling portion of the first key cap connector and the coupling portion of the second key cap connector are overlapped and coupled with each other.

4. The support apparatus for an insulator arm of claim 2, wherein the coupling portion of the first key cap connector and the coupling portion of the second key cap connector are formed to be coupled with each other in a socket-type structure.

5. The support apparatus for an insulator arm of claim 2, wherein the Y-shaped saddle has a bolt insertion hole formed therein for coupling with the coupling portion and the insulator arm support metal fitting.

6. The support apparatus for an insulator arm of claim 1, wherein the support rod is formed in a Y-shape and includes a bolt insertion hole for connection with the Y-shaped saddle and an insulator insertion hole having the support-rod-connecting insulator inserted thereinto.

7. The support apparatus for an insulator arm of claim 1, wherein if the insulator arm is divided into three or more pieces, two or more support apparatuses are installed.

8. The support apparatus for an insulator arm of claim 7, wherein if two or more of the support apparatuses are installed, the plurality of insulator arm support metal fittings are connected to cross one another.

\* \* \* \* \*